(12) United States Patent
Eom

(10) Patent No.: US 8,993,870 B2
(45) Date of Patent: Mar. 31, 2015

(54) SOLAR TRACKER FOR PHOTOVOLTAIC POWER GENERATION

(71) Applicant: Boon-Do Eom, Hwaseong-si (KR)

(72) Inventor: Boon-Do Eom, Hwaseong-si (KR)

(*) Notice: Subject to any disclaimer, the term of this patent is extended or adjusted under 35 U.S.C. 154(b) by 0 days.

(21) Appl. No.: 13/650,994

(22) Filed: Oct. 12, 2012

(65) Prior Publication Data

US 2014/0069481 A1 Mar. 13, 2014

(30) Foreign Application Priority Data

Sep. 13, 2012 (KR) .......................... 10-2012-0101422

(51) Int. Cl.
*F24J 2/46* (2006.01)
*F24J 2/54* (2006.01)

(52) U.S. Cl.
CPC ................ *F24J 2/5431* (2013.01); *Y02E 10/47* (2013.01); *F24J 2/4638* (2013.01)
USPC ......................................................... 136/246

(58) Field of Classification Search
CPC .................................................. H01L 31/0428
See application file for complete search history.

(56) References Cited

U.S. PATENT DOCUMENTS

| 2002/0139413 A1* | 10/2002 | Sasaki ........................... 136/246 |
| 2009/0256046 A1* | 10/2009 | Hausner et al. ................ 248/398 |
| 2010/0180883 A1* | 7/2010 | Oosting ........................ 126/574 |
| 2012/0152318 A1* | 6/2012 | Kee ............................... 136/246 |

FOREIGN PATENT DOCUMENTS

| JP | 2012-088026 A | 5/2012 | |
| KR | 10-2010-0023934 A | 3/2010 | |
| KR | 10-2010-0043118 A | 4/2010 | |
| KR | 10-2011-0121686 A | 8/2011 | |
| WO | WO 2011025300 | * 3/2011 | ............. B56D 90/10 |

* cited by examiner

*Primary Examiner* — Jennifer Michener
*Assistant Examiner* — Christopher Danicic
(74) *Attorney, Agent, or Firm* — Bret E. Field; Bozicevic, Field & Francis LLP

(57) ABSTRACT

A solar tracker is provided to fix an altitude angle until the altitude of the sun secedes from a predetermined range after matching the altitude through once driving of one shaft that tracks the altitude angle and to drive only the other shaft that tracks an east-west azimuth angle in daily repetition in a state where the altitude angle of the sun, which is repeatedly changed according to seasons of the year in the range of the winter solstice having the lowest altitude angle and the summer solstice having the highest altitude angle, has an extremely small diurnal change, whereas the azimuth angle of the sun is repeatedly changed in one direction, that is, from sunup to sundown, in a day. Accordingly, consumption of firm power of a driving unit for tracking the sun can be minimized, and the operating and management costs of the device can be reduced.

16 Claims, 19 Drawing Sheets (a)

(b)

SOLAR TRACKER FOR PHOTOVOLTAIC POWER GENERATION

CROSS-REFERENCE TO RELATED APPLICATION

This application is based on and claims priority from Korean Patent Application No. 10-2012-0101422, filed on Sep. 13, 2012 in the Korean Intellectual Property Office, the disclosure of which is incorporated herein in its entirety by reference.

BACKGROUND OF THE INVENTION

1. Field of the Invention

The present invention relates to a solar tracker for photovoltaic power generation. More particularly, the present invention relates to a solar tracker for photovoltaic power generation, which tracks an orientation movement of the sun in a day and a change of solar altitude that is the height of the sun depending on seasons using a direct cylinder to heighten power generation efficiency through forming of a solar cell plate at right angles to the sun to correspond to the movement (trace) of the sun.

2. Description of the Prior Art

In order to make a solar cell plate positioned at right angles to the sun, a solar tracker must drive at least two axes, that is, an X axis for tracking an azimuth angle with respect to diurnal movement of the sun and a Y axis for tracking an altitude angle with respect to seasonal movement of the sun, and various types of mechanical configurations may be adopted to achieve this. FIG. 1 is a perspective view of a solar tracker 1 in the related art that is devised to rotate about the X axis to track an east-west azimuth angle and to rotate about the Y axis to aim at the altitude of the sun.

According to the solar tracker 1 in the related art, in order to track the azimuth angle and the altitude angle of the sun, it is required to continuously drive both an azimuth angle tracking device and an altitude angle tracking device to continuously track the azimuth angle and the altitude angle of the sun. Accordingly, the solar tracker in the related art has the problems that complicated mathematical calculations through a computer are required, or precise control and frequent driving of the tracking devices are required to cause the tracking devices to frequently get out of order.

Further, as the solar cell plate becomes large-sized to obtain a larger quantity of electric power, structure design is required to achieve rigidity to sufficiently endure against deformation or shaking of the panel due to external actions such as strong wind and the like, separately from the mechanical performance thereof, and to prevent overturn of the overall structure. Accordingly, the structure becomes complicated with heavy weight, and the manufacturing and constructing costs are increased.

SUMMARY OF THE INVENTION

Accordingly, the present invention has been made to solve the above-mentioned problems occurring in the related art while advantages achieved by the related art are maintained intact.

An embodiment of the present invention is related to providing of a solar tracker including a driving device which has a simple structure with rigidity and endurance to sufficiently endure against wind pressure, and can accurately control an altitude angle and an azimuth angle through a simple mechanical operation.

In one aspect of the present invention, there is provided a solar tracker which includes a solar cell plate including one or more solar cell panels; an upper structure including supporting the solar cell plate; a main post and a base bottom portion supporting the upper structure; an altitude angle adjustment direct cylinder adjusting an altitude angle of the solar cell plate to correspond to an altitude of the sun that is seasonally changed; and an azimuth angle adjustment direct cylinder adjusting an azimuth angle according to time to correspond to a diurnal movement of the sun if the altitude angle is fixed by the altitude angle adjustment direct cylinder.

In this case, an upper surface of the base bottom portion is fixed to one end portion of the main post, is connected to one end portion of the altitude angle adjustment direct cylinder through a hinge having a single degree of freedom, and is connected to one end portion of the azimuth angle adjustment direct cylinder through a locking type crisscross connector having two degrees of freedom. A bottom surface of the upper structure is connected to the other end portions of the main post, the altitude angle adjustment direct cylinder, and the azimuth angle adjustment direct cylinder through locking type crisscross connectors, respectively.

Since the locking type crisscross connectors are vulnerable to breakdown due to an external effort force acting on the side surfaces thereof in the case where they are used on the structure, rotation locking portions for restricting rotational movement with two degrees of freedom are provided to restrict relative movement of the locking type crisscross connectors that are connected to the altitude angle adjustment direct cylinder and the azimuth angle adjustment direct cylinder after the altitude angle adjustment direct cylinder and the azimuth angle adjustment direct cylinder complete the angle adjustment operations so that the overall structure can be structurally stabilized as a rigid body.

Further, the solar cell plate may include a plurality of solar cell panels arranged with a predetermined size, and may be used in a photovoltaic power generation device that performs large-scale power generation. In order to solve the problems that such a large-scale solar cell plate is vulnerable to wind pressure, a rotary shaft is provided in each solar cell panel, a worm gear is installed at one end of the rotary shaft, and a worm gear device is attached so that a motorized or air pressure type motor is engaged with the worm gear provided at the one end of the rotary shaft to enable the solar cell panel to be opened or closed. An opening/closing adjustment portion may be provided to mitigate the wind pressure that acts on the structure through opening of the solar cell panel when the wind pressure reaches a predetermined strength.

Further, in order to drive the upper structure that includes the solar cell plate to match the altitude angle and the azimuth angle of the sun, the direct cylinder may include a complex multistage direct cylinder having a heavy weight and a long stroke distance, which can be obtained by coupling a plurality of single direct cylinders in parallel and coupling the coupled signal direct cylinders as a plurality of stages.

As illustrated in FIG. 2, the altitude angle of the sun, which is repeatedly changed according to seasons of the year in the range of the winter solstice having the lowest altitude angle and the summer solstice having the highest altitude angle, has an extremely small diurnal change, whereas the azimuth angle of the sun is repeatedly changed in one direction, that is, from sunup to sundown, in a day. The solar tracker according to the present invention fixes the altitude angle until the altitude of the sun secedes from a predetermined range after matching the altitude through once driving of one shaft that tracks the altitude angle, and drives only the other shaft that tracks the east-west azimuth angle in daily repetition. Accordingly, the consumption of firm power of the driving unit for tracking the sun can be minimized, and the operating and management costs of the device can be reduced.

According to the solar tracker according to the present invention, since the direct cylinder that is a driving device for adjusting the angle of the solar cell plate also serves as the base structure of the device, the structure of the driving device can be remarkably simplified to unlimitedly lengthen the size and capacity of the photovoltaic power generator per unit device, the manufacturing and constructing costs can be greatly reduced, and the endurance can be heightened.

Since the solar tracker according to the present invention can open and close the plurality of solar cell panels, the wind pressure that acts on the while solar cell plate is mitigated by opening a part of or all the solar cell panels when the wind pressure reaches the predetermined strength, and thus the safety and the endurance of the overall structure of the solar tracker can be secured.

Further, according to the solar tracker according to the present invention that uses the locking type crisscross connectors and the direct cylinders, the weight of the large-capacity structure and the external effort force such as wind pressure can be appropriately dispersed to and supported by the main post and the direct cylinders, and the solar tracker can be installed with a high height from the ground. Accordingly, the utilization of the space below the solar tracker becomes natural and the damage of the green space can be minimized.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a solar tracker according to preferred embodiments of the present invention will be described in detail with reference to the accompanying drawings.

Figure 1:
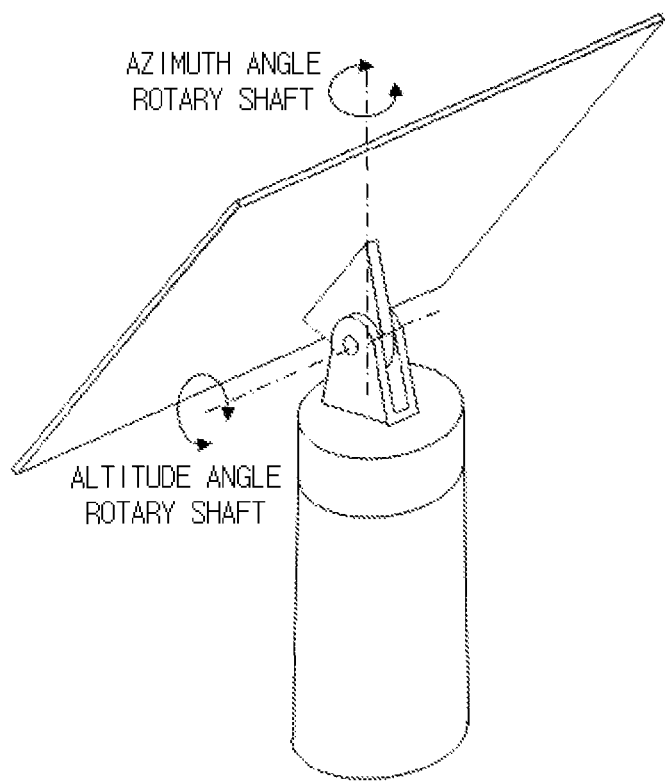
FIG. 1 is a perspective view illustrating an example of a solar tracker in the related art.
Figure 2:
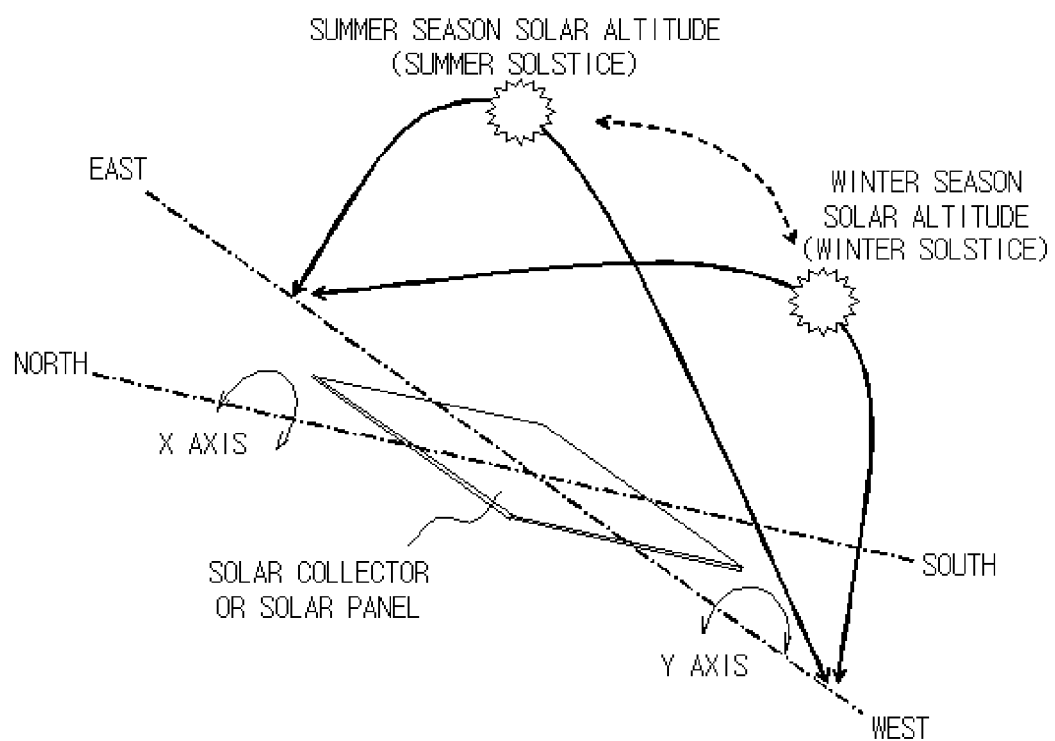
FIG. 2 is a view explaining an altitude angle and an azimuth angle of the sun which are changed according to a change of seasons and days.
Figure 3:
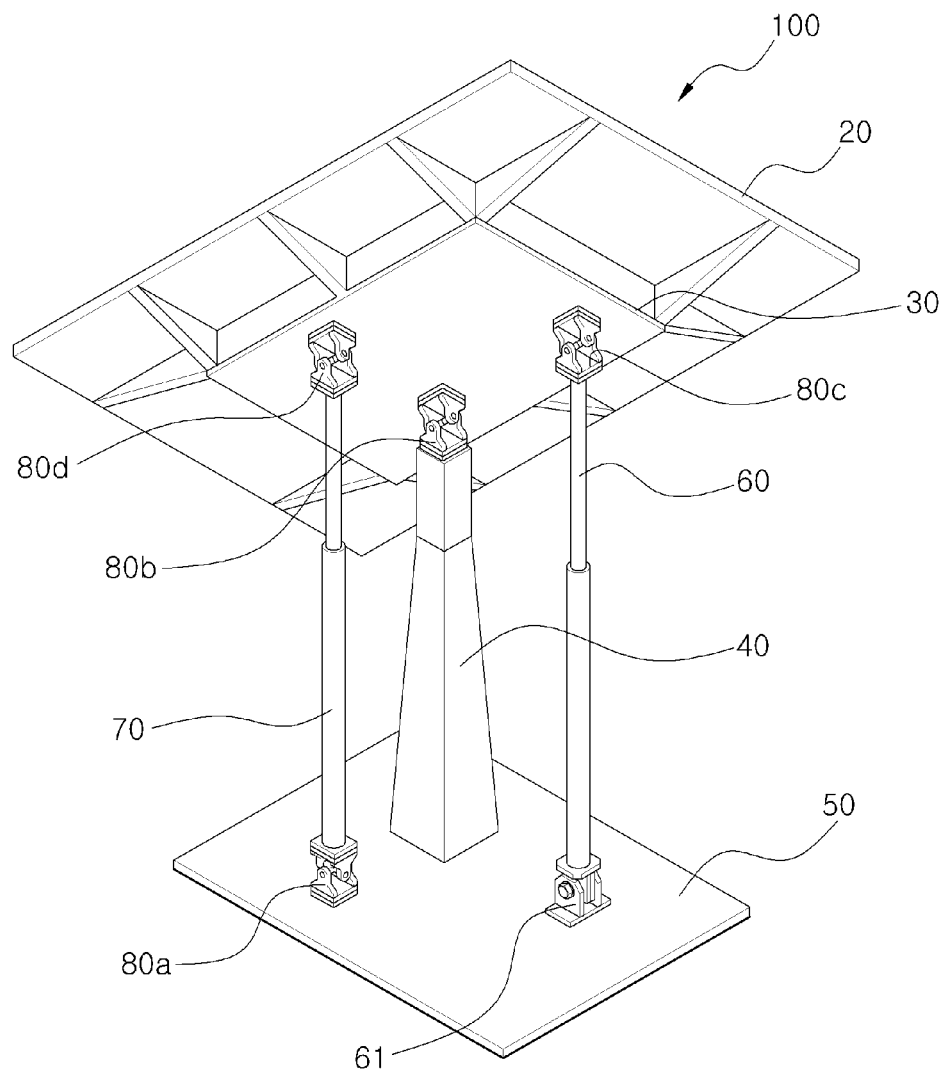
FIG. 3 is a perspective view of a solar tracker for photovoltaic power generation according to an embodiment of the present invention.

FIG. 3 is a perspective view of a solar tracker for photovoltaic power generation according to an embodiment of the present invention.

As illustrated in FIG. 3, a solar tracker 100 that is driven to trace solar light depending on the change of solar altitude and azimuth includes a solar cell plate 20 including one or more solar cell panels 10, an upper structure 30 on which the solar cell plate 20 is mounted, and a main post 40 and a base bottom portion 50 supporting the load of the solar tracker 100 for supporting the upper structure 30.

At this time, it is preferable that the base bottom portion 50 may be formed of a concrete or steel structure to sufficiently endure the turnover or tilting of the solar tracker 100 or strong wind pressure.

Further, the solar tracker includes an altitude angle adjustment direct cylinder 60 adjusting an altitude angle of the solar cell plate to correspond to an altitude of the sun that is seasonally changed, and an azimuth angle adjustment direct cylinder 70 adjusting an azimuth angle that is at right angles to the altitude angle according to time to correspond to a diurnal movement of the sun if the altitude angle is fixed by the altitude angle adjustment direct cylinder 60. If an operation command of a signal or current is received from a control device (not illustrated), the altitude angle adjustment direct cylinder 60 and the azimuth angle adjustment direct cylinder 70 extend or contract to perform a straight movement upward and downward, and an azimuth angle rotary shaft and an altitude angle rotary shaft are rotated so that the upper structure 30 tracks the sun to face the sun in a vertical direction.

At this time, an upper surface of the base bottom portion 50 is fixed to one end portion of the main post 40, is connected to one end portion of the altitude angle adjustment direct cylinder 60 through a hinge 61 having a single degree of freedom, and is connected to one end portion of the azimuth angle adjustment direct cylinder 70 through a locking type crisscross connector 80a having two degrees of freedom. A bottom surface of the upper structure 30 is connected to the other end portions of the main post 40, the altitude angle adjustment direct cylinder 60, and the azimuth angle adjustment direct cylinder 70 through the locking type crisscross connectors 80b, 80c, and 80d, respectively.

It is preferable that the center of gravity of the upper structure 30 is positioned between points where the locking type crisscross connectors 80b, 80c, and 80d are connected to the bottom surface of the upper structure 30 to provide a stable structure.

The locking type crisscross connectors 80b, 80c, and 80d for connecting the altitude angle adjustment direct cylinder 60, the azimuth angle adjustment direct cylinder 70, and the main post 40 with the upper structure 30 and the base bottom portion 50 have crisscross mechanical shafts 93 with two degrees of freedom, and thus the respective mechanical shafts can form any angle between them.

Figure 4:
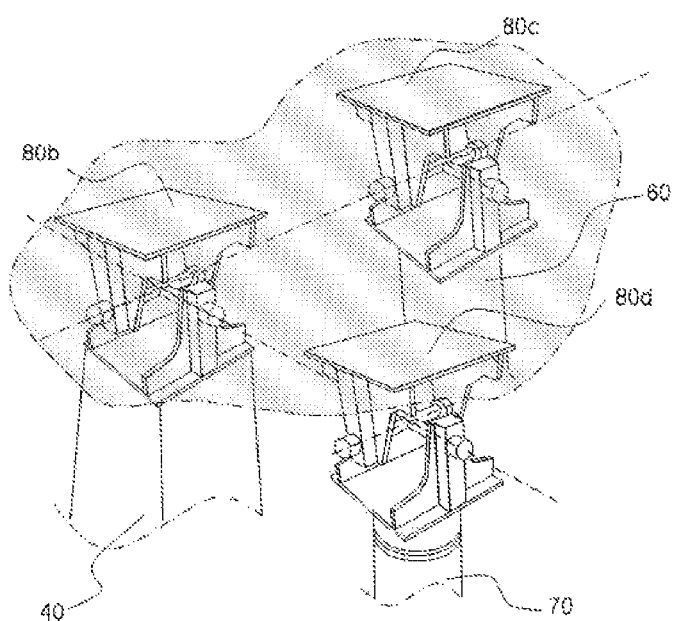
FIG. 4 is a view illustrating an arrangement of locking type crisscross connectors according to an embodiment of the present invention.

As illustrated in FIG. 4, in order to prevent distortion of the solar tracker 100 due to the rotating force and to achieve mechanically stable driving, it is necessary to make the locking type crisscross connector 80b that connects the bottom surface of the upper structure 30 with one end portion of the main post 40 in a state where the upper structure 30 is horizontally maintained and the locking type crisscross connector 80d that connects the altitude angle adjustment direct cylinder 70 with the bottom surface of the upper structure 30 concentrically coincide with each other to configure any one shaft of the crisscross mechanical shafts of the locking type crisscross connectors 80b and 80d as the altitude angle rotary shaft (Y axis) of the solar tracker 100. Further, it is necessary to make the locking type crisscross connector 80b that connects the bottom surface of the upper structure 30 with one end portion of the main post 40 and the locking type crisscross connector 80c that connects the altitude angle adjustment direct cylinder 60 with the bottom surface of the upper structure 30 concentrically coincide with each other to configure one remaining shaft of the crisscross mechanical shafts of the locking type crisscross connector 80b as the altitude angle rotary shaft (X axis) of the solar tracker 100. Further, it is preferable that the crisscross connectors 80b, 80c, and 80d that connect the main post 40, the azimuth angle adjustment direct cylinder 70, and the altitude angle adjustment direct cylinder 60 with the bottom surface of the upper structure 30 are installed to be arranged in the same direction so that the upper structure 30 can smoothly be rotated.

Figure 5:
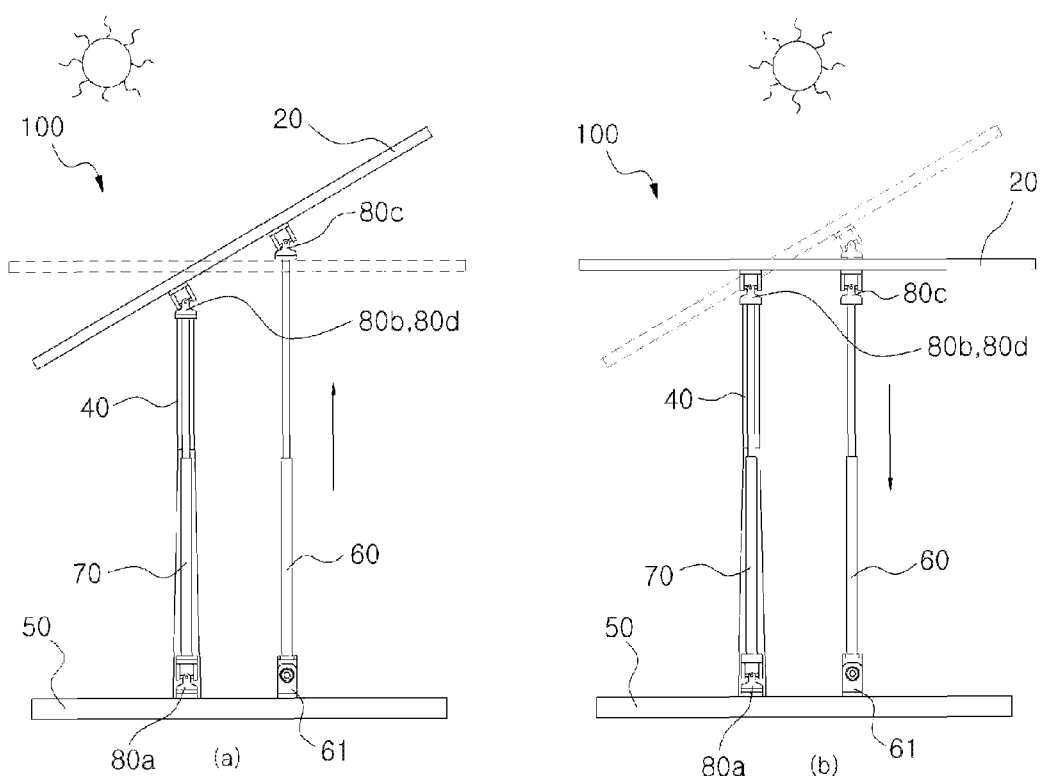
FIGS. 5A and 5B are side views explaining adjustment of an altitude angle of a solar tracker for photovoltaic power generation according to an embodiment of the present invention.

Referring to FIG. 5A, according to the solar tracker 100 as configured above, if the solar altitude is lowered, the altitude angle adjustment direct cylinder 60 is lengthened according to a command of a control device (not illustrated) and the upper structure 30 is rotated about the altitude angle rotary shaft to lower the altitude thereof along the sun, while if the solar altitude is heightened as shown in FIG. 5B, the altitude angle adjustment direct cylinder 60 is shortened according to the command of the control device and the upper structure 30 is reversely rotated about the altitude angle rotary shaft to heighten the altitude thereof along the sun.

Figure 6:
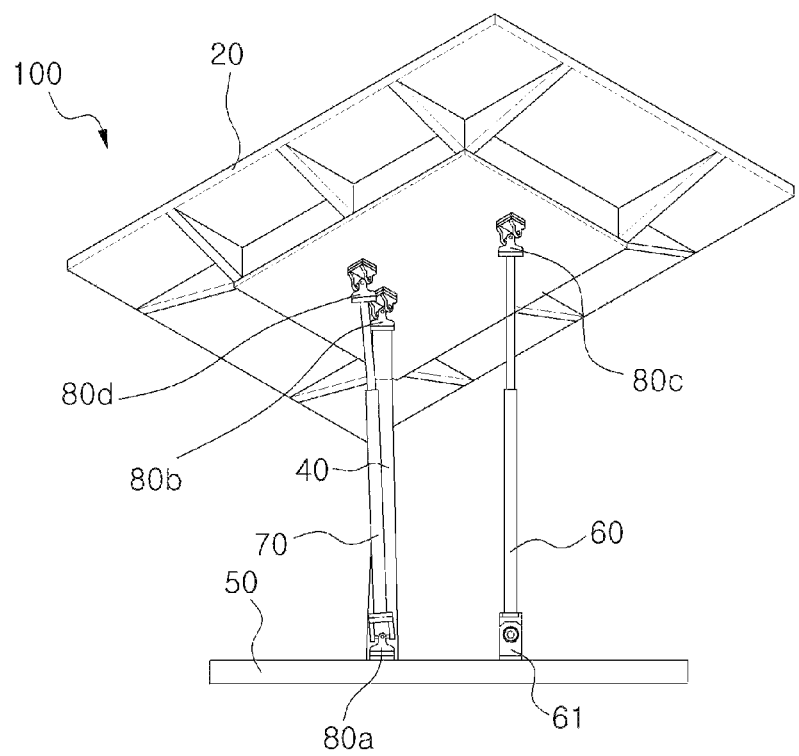
FIG. 6 is a perspective view explaining adjustment of an altitude angle and an azimuth angle of a solar tracker for photovoltaic power generation according to an embodiment of the present invention.

In an example as illustrated in FIG. 6, the upper structure 30 is rotated at a certain angle as the azimuth angle adjustment direct cylinder 70 operates to be lengthened or shortened in a state where the upper structure 30 is rotated about the altitude angle rotary shaft to maintain a certain altitude angle as the altitude angle adjustment direct cylinder 60 is lengthened. If the altitude angle adjustment direct cylinder 60 that moves the altitude angle rotary shaft is stopped, the altitude angle is maintained, and if the azimuth angle adjustment direct cylinder 70 that moves the azimuth angle rotary shaft is lengthened or shortened in this state, the solar tracker 100 repeats the azimuth angle tracking at the maintained altitude angle. That is, after the altitude is set through once driving of the altitude angle rotary shaft that tracks the altitude angle, the altitude angle is fixed until the altitude of the sun secedes from the predetermined range, and thereafter, only the azimuth angle adjustment direct cylinder 70 that tracks the east-west azimuth angle is driven to simplify the operation of the solar tracker 100.

Figure 7:
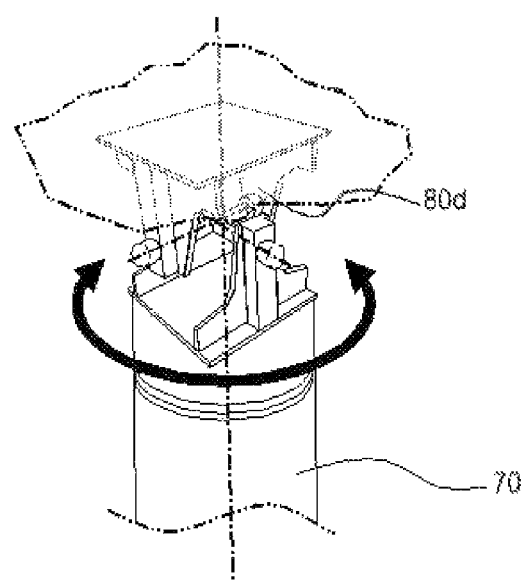
FIG. 7 is a view illustrating an assembling state of an azimuth angle adjustment direct cylinder according to an embodiment of the present invention.
Figure 8:
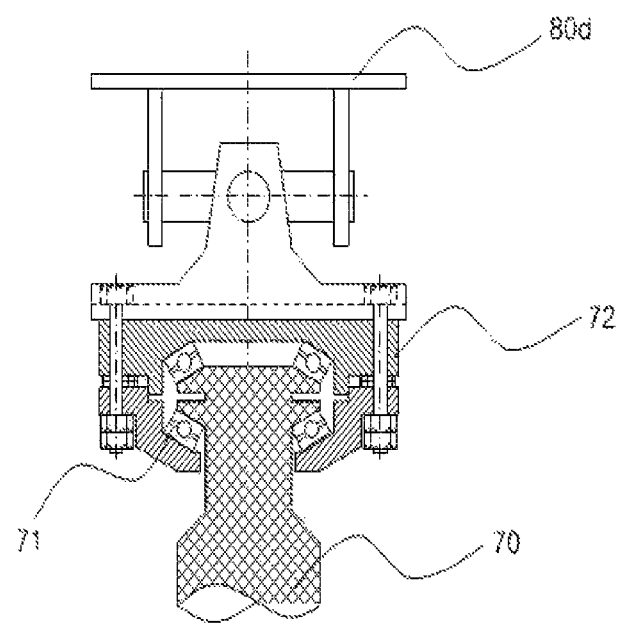
FIG. 8 is a cross-section view illustrating an assembling state of an azimuth angle adjustment direct cylinder according to an embodiment of the present invention.

As illustrated in FIGS. 7 and 8, in order for the azimuth angle adjustment direct cylinder 70, which is connected to the locking type crisscross connector 80d that has two degrees of freedom on the bottom surface of the upper structure 30, to remove the twist of the azimuth angle adjustment direct cylinder 70 that occurs due to the driving of the altitude angle adjustment direct cylinder 60 and the azimuth angle adjustment direct cylinder 70 as the upper structure 30 is rotated to achieve a smooth operation and stable structure, it is preferable that a thrust bearing 71 is inserted between the locking type crisscross connector 80d and the azimuth angle adjustment direct cylinder 70 and a bearing holder 72 is fixed thereto when the locking type crisscross connector 80d and the azimuth angle adjustment direct cylinder 70 are connected with each other so that the azimuth angle adjustment direct cylinder 70 can be freely rotated about the shaft in the direction of the length of the azimuth angle adjustment direct cylinder 70.

Further, in another embodiment of the present invention, the solar tracker 100 uses only one direct cylinder and the remaining direct cylinder may be fixed to the main post. In this case, one-shaft type tracker that has a strong structure and reduces the mechanical operation portion can be configured.

According to an embodiment of the present invention, the solar tracker 100 includes one fixed main post 40, the auxiliary altitude angel adjustment direct cylinder 60, and the auxiliary azimuth angle adjustment direct cylinder 70, and thus the overall structure of the tracker 100 has three posts to sufficiently resist against the vertical effort force including the vertical load. However, since both ends of the altitude angle adjustment direct cylinder 60 and the azimuth angle adjustment direct cylinder 70 are connected through the hinge 61 or the locking type crisscross connector 80 having the crisscross mechanical shaft 93 that can be freely rotated, the connection portions are vulnerable to vibration or shaking that acts on the side surface due to the wind pressure or the like. Accordingly, after the driving of the solar tracker 100 is completed, the relative rotational movement of the locking type crisscross connector 80 is restricted according to the command or signal from the control device (not illustrated) to enable the overall structure to function as a rigid body.

Figure 9:
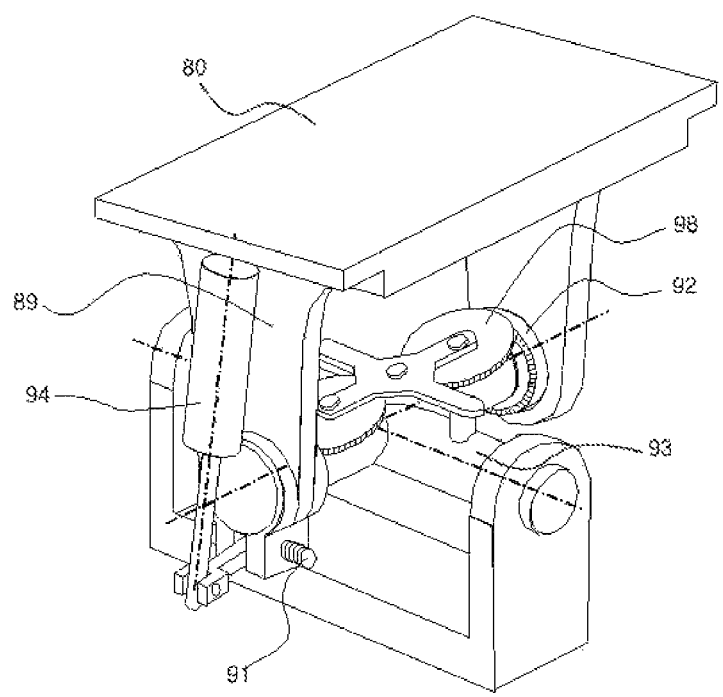
FIG. 9 is a perspective view illustrating a locking type crisscross connector of a solar tracker for photovoltaic power generation according to an embodiment of the present invention.
Figure 10:
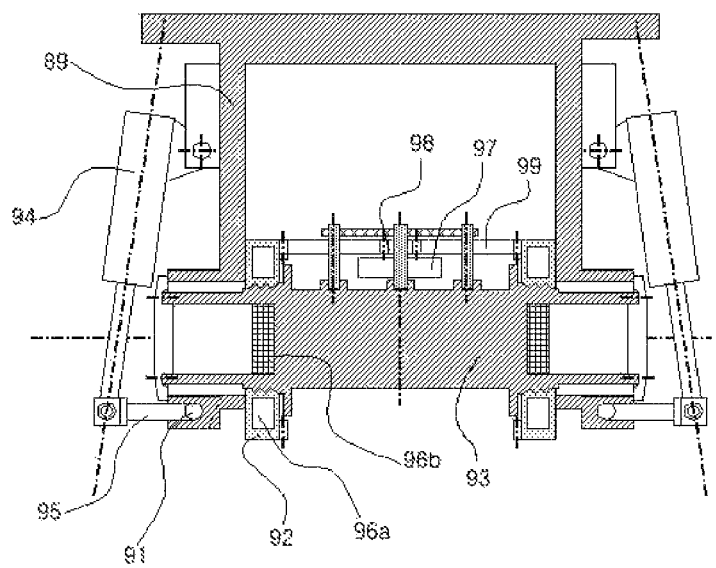
FIG. 10 is a cross-sectional view illustrating a locking type crisscross connector of a solar tracker for photovoltaic power generation according to an embodiment of the present invention.

The locking type crisscross connector 80 includes a crisscross mechanical shaft 93 provided therein to perform rotational movement with two degrees of freedom. FIG. 9 illustrates the locking type crisscross connector 80 that can restrict the relative rotational movement. For this, the locking type crisscross connector 80 may include a clamp bolt 91, a locking nut 92, and a cylinder 94. As illustrated in FIG. 10, in order to suppress the rotational movement of a shaft arm 89 of the locking type crisscross connector 80 and the crisscross mechanical shaft 93, a cut portion is formed by cutting a lower end of the shaft arm 89 that supports both end portions of the crisscross mechanical shaft 93 in the locking type crisscross connector 80, a through-hole is formed in the cut portion to tighten and loosen the cut portion, and the clamp bolt 91 included in the locking type crisscross connector is provided in the through-hole of the cut portion. Further, one end of a clamp rod 95 that enables the clamp bolt 91 to tighten and loosen the cut portion is connected with the clamp bolt 91 in the cut portion. The other end of the clamp rod 95 is connected with a rod of the cylinder 94, and the cylinder 94 is fixed to an outer surface of the shaft arm 89 of the locking type connector.

Figure 11:
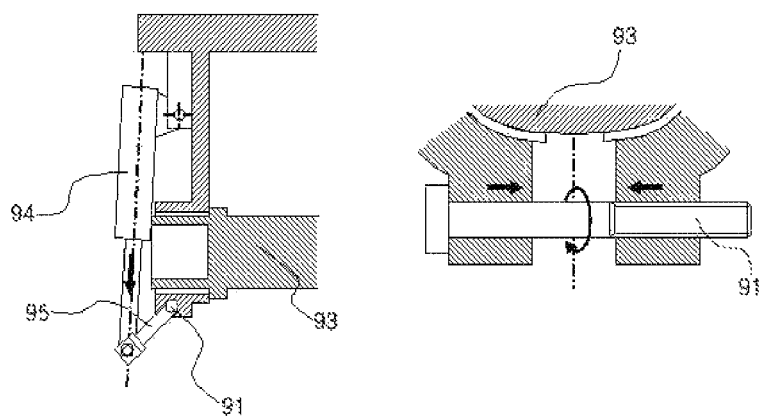
FIG. 11 is a cross-sectional view illustrating a locking state of a locking type crisscross connector of a solar tracker for photovoltaic power generation through an operation of a clamp bolt according to an embodiment of the present invention.

As illustrated in FIG. 11, if the cylinder rod of the cylinder 94 is lengthened by electricity or fluid power, it lowers the clamp rod 95 connected thereto downward, and the clamp rod 95 rotates the clamp bolt 91. Accordingly, the cut portion of the shaft arm 89 of the cut crisscross connector is pulled to restrict the rotational movement of the shaft arm 89 of the locking type crisscross connector and the crisscross mechanical shaft 93.

Figure 12:
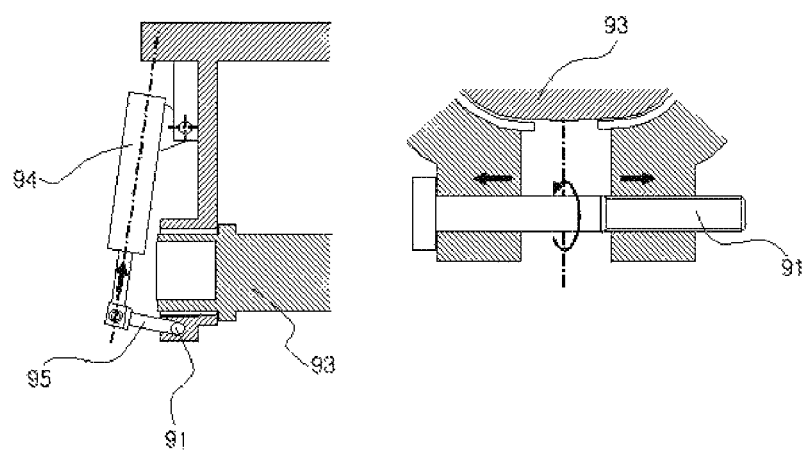
FIG. 12 is a cross-sectional view illustrating a locking release state of a locking type crisscross connector of a solar tracker for photovoltaic power generation through an operation of a clamp bolt according to an embodiment of the present invention.

By contrast, as illustrated in FIG. 12, if the cylinder rod of the cylinder 94 is shortened by the electricity or fluid power, it pulls the clamp rod 95 upward, and the clamp rod 95 rotates the clamp bolt 91 in reverse direction. Accordingly, in the case of a right-handed screw, a gap of the cut portion of the shaft arm 89 of the locking type crisscross connector widens to be loosened, and thus the rotational movement of the shaft art 89 of the locking type crisscross connector and the crisscross mechanical shaft 93.

Figure 13:
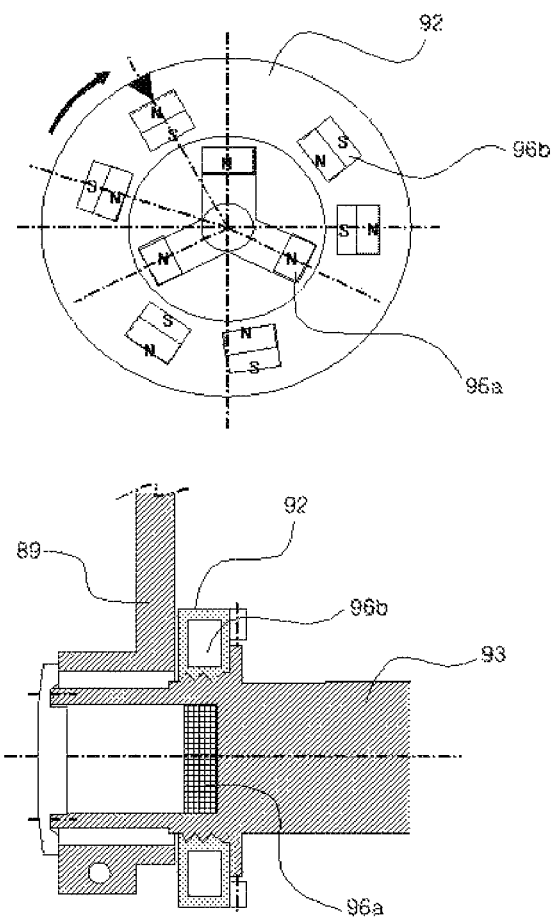
FIG. 13 is a cross-sectional view illustrating a locking type crisscross connector of a solar tracker for photovoltaic power generation, in which a locking nut and an electromagnet are installed, according to an embodiment of the present invention.

Further, as shown in FIG. 13, the locking type crisscross connector 80 is configured in a manner that an electromagnet 96a is inserted in the crisscross mechanical shaft 93, screw threads are formed on an outside of a portion in which the electromagnet 96a that is inserted into the crisscross mechanical shaft 93 is positioned to be engaged with the locking nut 92 that is a female screw, and an electromagnet 96b is built in the locking nut 92. If DC current flows to the electromagnets 96a and 96b, the electromagnets 96a and 96b are polarized to produce attraction and repulsion power and thus the locking nut 92 is rotated at a predetermined angle to cause the occurrence of a fastening force of the screw.

In order to further secure the fastening force, as illustrated in FIG. 10, the locking type crisscross connector 80 is configured in a manner that an electric, air pressure type, or hydraulic motor 97 is installed in empty space of the locking type crisscross connector 80, gears processed on side surface portions of the locking nut 92 are engaged with each other through a driving gear 98 connected to the motor and a driven gear 99 engaged with the driving gear 98, and the locking nut 92 is rotated by the rotation of the motor 97 to additionally restrict the rotational movement of the shaft arm 89 of the locking type crisscross connector and the crisscross mechanical shaft 93. In this case, the locking nut 92 is rotated by the magnetic force of the electromagnets 96a and 96b, and thus the shaft arm 89 of the locking type crisscross connector is tightened to restrict the rotational movement. In this case, even if the locking nut 92 is unable to show complete fastening force in some reasons, additional rotating force is compulsorily added to the locking nut 92 through the engaged gears by the driving force of the motor 97, and thus more complete locking can be achieved.

The above-described methods for preventing the relative rotational movement of the locking type crisscross connector 80 may be applied to both sides of the crisscross mechanical shaft 93 to restrict the both sides or may be applied to only one side of the crisscross mechanical shaft 93 of the locking type crisscross connector 80 to restrict the only one side. It is preferable to selectively apply the methods depending on the size and the weight of the solar tracker.

Further, the solar cell plate 20 includes a plurality of solar cell panels 10 arranged with a predetermined size, and may be used in a photovoltaic power generation device that performs large-scale power generation. In order to solve the problems that such a large-scale solar cell plate is vulnerable to the wind pressure, a rotary shaft 111 is provided in the solar cell panel 10, stoppers 116a and 116b are mounted on the outline of the solar cell panel 10, a motorized or air pressure type motor 113, a worm 114, and a worm gear 115 are installed to open and close the solar cell panel 10 as a rotary door. A panel opening/closing adjustment portion 110 may be provided to mitigate the wind pressure that acts on the structure through opening of the solar cell panel so that the strong wind passes through the open solar cell panel 10 when the wind pressure reaches a predetermined strength.

Figure 14:
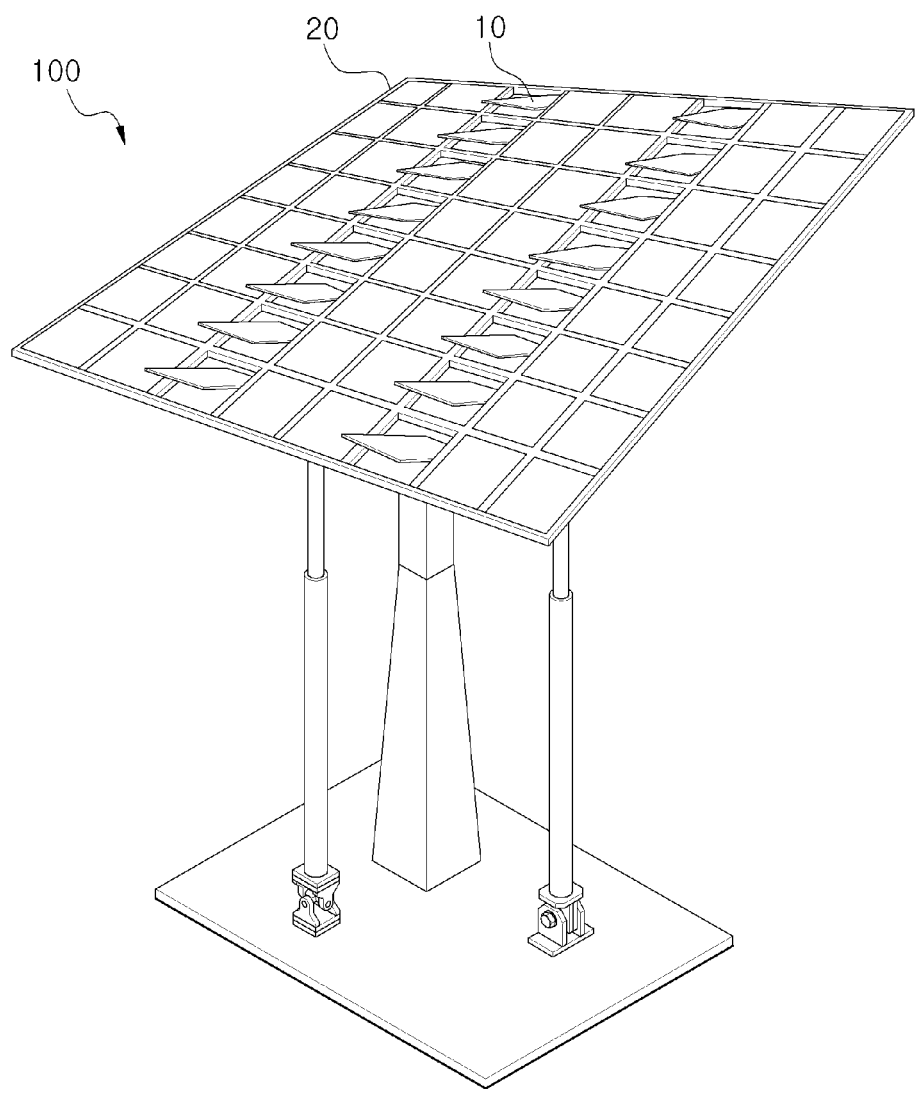
FIG. 14 is a perspective view illustrating an open state of solar cell panels in a solar tracker for photovoltaic power generation according to an embodiment of the present invention.
Figure 15:
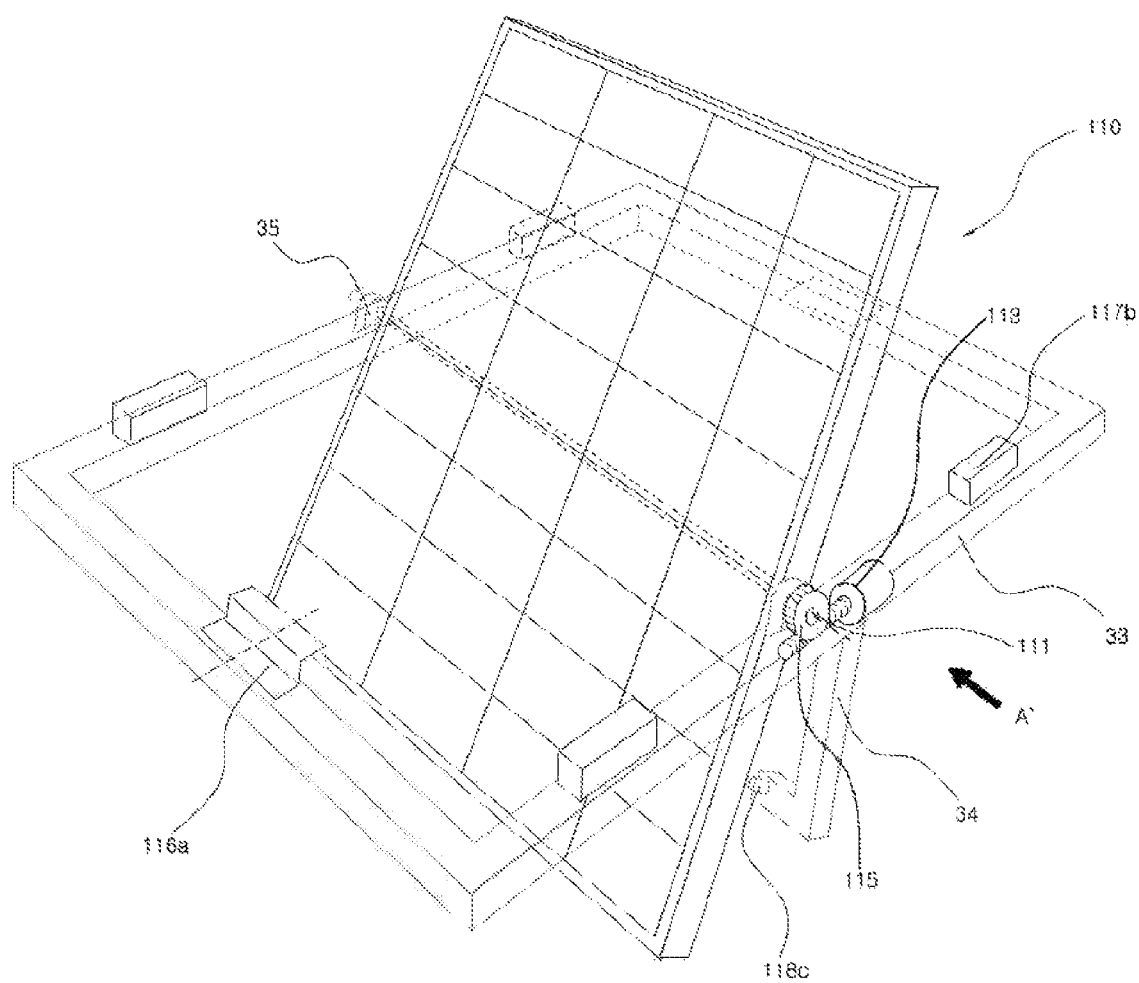
FIG. 15 is a perspective view explaining a method for opening solar cell panels in a solar tracker for photovoltaic power generation according to an embodiment of the present invention.

FIG. 14 is a perspective view illustrating an example of the solar tracker 100 having a large-scale solar cell plate 20 with the panel opening/closing adjustment portion 110. FIG. 14 shows a state where two columns of solar cell panels 10 are simultaneously opened to reduce the wind pressure that acts on the whole solar cell panels 10. In the panel opening/closing adjustment portion 110, as shown in FIG. 15, a rotary shaft 111 is installed inside the center of the solar cell panel 10 so that the solar cell panel 10 can be rotated, a worm gear 115 is mounted at one end of the rotary shaft 111, and a bearing holder 35 is connected to the other end of the rotary shaft 111 to be rotatable. Further, a frame 33 that constitutes the upper structure 30 is installed on the outside of the solar cell panel 10, the rotary shaft 111 is positioned on an upper surface of the frame 33 by a rotary shaft holder 35, and a first stopper 116a and a second stopper 116b are mounted on the left and right of the rotary shaft 111 of the frame 33 that corresponds to a portion on which the solar cell panel 10 is opened or closed as being rotated about the rotary shaft 111. The worm 114 that is engaged with the worm gear 115 provided at one end of the rotary shaft and a motor 113 that has a built-in speed reducer to rotate the worm 114 are connected to each other and are mounted on the upper surface of the frame 33.

Further, a pair of a first lock lever unit 117a and a second lock lever unit 117b are vertically and horizontally provided on the frame 33 in a direction that is at right angles to the direction in which the rotary shaft 111 of the solar cell panel 10 is installed, and locking grooves 119 are formed on left and right surfaces of the solar cell panel 10 which correspond to the first lock lever unit 117a and the second lock lever unit 117b. A first limit switch 118a and a second limit switch 118b are installed inside the locking groove 119 on one of the left and right surfaces, a bracket 34 is installed on a lower portion of the frame 33, and a third limit switch 118c is mounted at an end of the bracket 34 so that the limit switch 118c becomes in contact with the solar cell panel at a point where the solar cell panel is opened at a specified angle.

Figure 16:
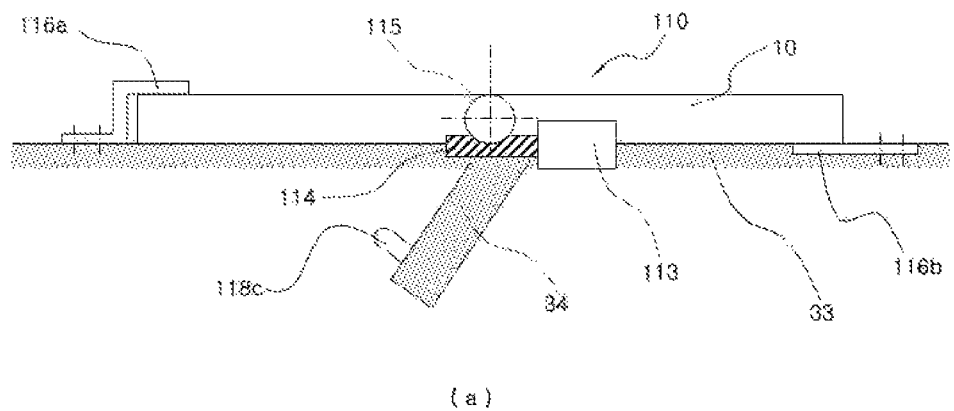
FIGS. 16A and 16B are plan views explaining opening of solar cell panels in a solar tracker for photovoltaic power generation according to an embodiment of the present invention, as seen from "A" in FIG. 15.
Figure 16:
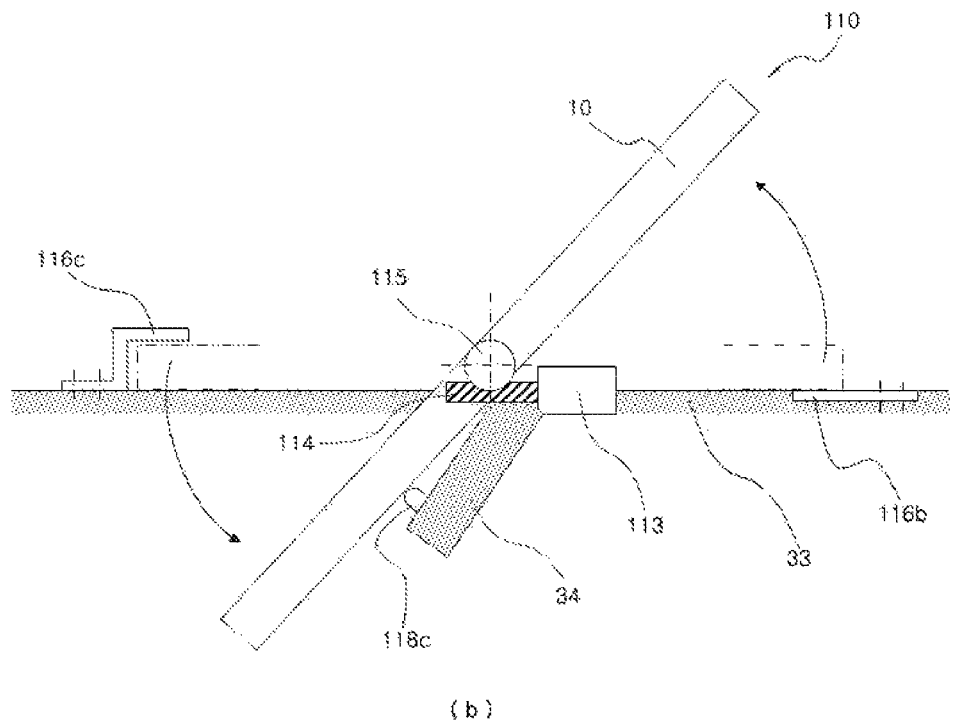

FIGS. 16A and 16B are plan views explaining opening of the solar cell panel 10 as seen from "A" in FIG. 15. FIG. 16A illustrates a case where the solar cell panel 10 is closed, and FIG. 16B illustrates a case where the solar cell panel 10 is opened. The solar cell panel 10 may be rotated by the operation of the motor 113 within a predetermined angle range which is set by the third limit switch 118c provided on the bracket 34 that is positioned at a specified opening angle, and may not be rotated in the reverse direction by the first stopper 116a and the second stopper 116b.

Figure 17:
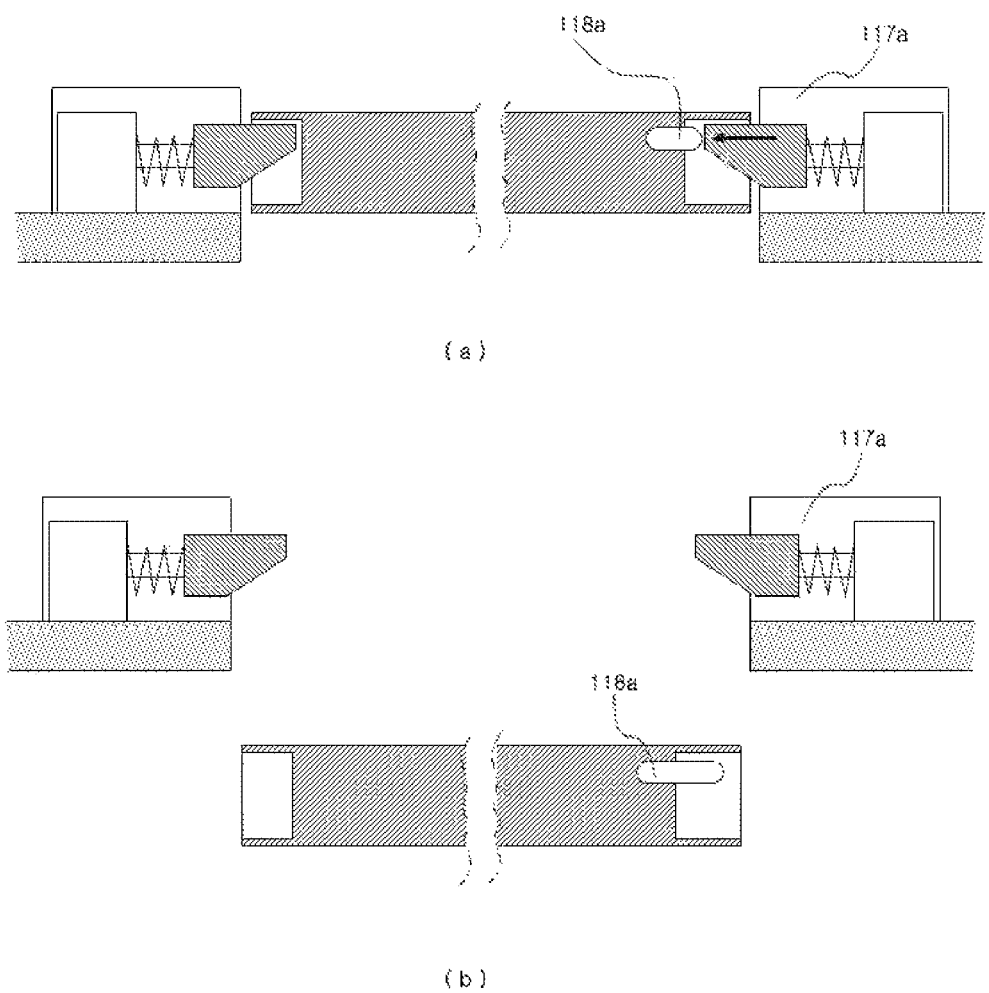
FIGS. 17A and 17B are cross-sectional views explaining opening and closing state of solar cell panels in a solar tracker for photovoltaic power generation according to an embodiment of the present invention.

FIGS. 17A and 17B are cross-sectional views explaining opening and closing state of the solar cell panel 10. In the state where the solar cell panel 10 is closed as shown in FIG. 17A, the first limit switch 118a and the second limit switch 118b, which are provided in line in the locking groove 119 on the side surfaces of the solar cell panel 10 to correspond to the first lock lever unit 117a, are simultaneously pressed by the lock lever of the first lock lever unit 117a to be in a turned-off state, and thus the motor 113 that rotates the solar cell panel 10 can operate in neither a forward direction nor a backward direction.

In the case of opening the solar cell panel 10, it is required that a panel opening switch (not illustrated) of the panel opening/closing adjustment portion 110 operates. When the panel opening switch becomes in a turned-on state, a panel closing switch (not illustrated) of the panel opening/closing adjustment portion 110 is released to be in a turned-off state, and a panel closing circuit is unable to operate. In this case, as illustrated in FIG. 17B, since single solenoids built in the first lock lever unit 117a and the second lock lever unit 117b operate to move backward, the solar cell panel 10 is in an openable state, and the first limit switch 118a and the second limit switch 118b are released from their pressed state to make the motor 113 start its operation. At this time, even if the second limit switch 118b that controls the motor 113 to be rotated in reverse direction is released from the pressed state, the panel closing circuit remains in a turned-off state and does not operate.

As illustrated in FIG. 16B, since the worm 114 is rotated through the speed reducer (not illustrated) by the operation of the motor 113 and the worm gear 115 that is engaged with the worm 114 is rotated, the solar cell panel 10 is opened slowly, and if the solar cell panel 10 reaches a specified opening angle, it presses the third limit switch 118c that is at an appropriate position. At this time, the third limit switch 118c is released to stop the operation of the motor 113, and the single solenoids of the first lock lever unit 117a and the second lock lever unit 117b are released to move forward to make the lock levers return to their original positions by spring forces, respectively.

By contrast, in the case of closing the solar cell panel 10, it is required to operate the panel closing switch of the panel opening/closing adjustment portion 110. At a moment where the panel closing switch becomes in a turned-on state, the panel opening switch is released to be in a turned-off state, and thus a panel opening circuit is unable to operate. On the other hand, the motor 113 starts its operation in reverse direction due to the change of the polarity of current, and the worm gear 115 is rotated through the worm 114 to close the solar cell panel 10. At this time, although the third limit switch 118c that has been pressed to be in a turned-off state is recovered to the turned-on state, the solar cell panel opening circuit is released to be in the turned-off state and thus does not operate. Further, if the solar cell panel 10 is closed to reach the first lock lever unit 117a and the second lock lever unit 117b and the side surface of the solar cell panel 10 pushes a tilted surface of the lock lever, the lock lever is pushed backward, and at a moment where the lock lever is pushed over a predetermined distance, the first limit switch 118a and the second limit switch 118b, which are built in the locking groove 119 on the side surface of the solar cell panel, are pressed by the lock lever that is pushed by a spring force to be in the turned-off state (to be released). Simultaneously with this, the motor 113 stops its operation, and the solar cell panel 10 is not opened in any direction (is fixed) by the first and second stoppers 116a and 116b and the first and second lock lever units 117a and 117b.

Figure 18:
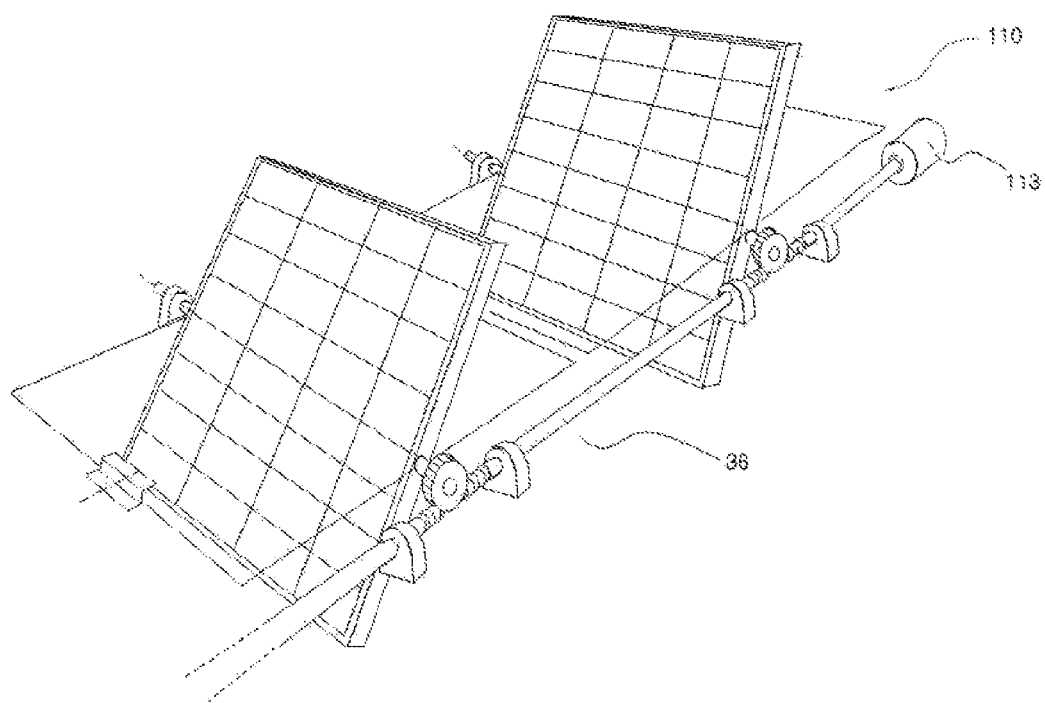
FIG. 18 is a perspective view explaining simultaneous opening of plural solar cell panels which are connected in series by one motor according to another embodiment of the present invention.

As illustrated in FIG. 18, the panel opening/closing adjustment portion of the solar cell panel 10 according to another embodiment of the present invention may be configured in a manner that respective worm gears included in a plurality of solar cell panels 10 are connected in a line to one worm gear driving shaft 36 that is positioned on the upper surface of the frame, and by operating one motor 113 connected to one end of the worm gear driving shaft, the plurality of solar cell panels connected in series are simultaneously opened or closed.

Figure 19:
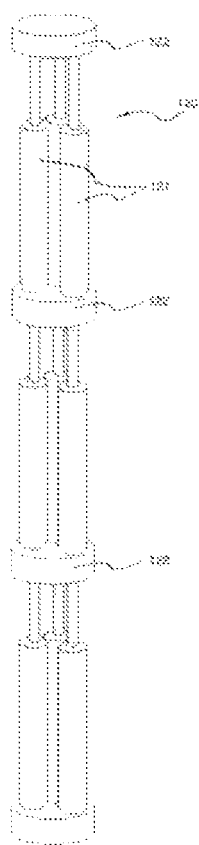
FIG. 19 is a perspective view of a direct cylinder that can be used according to another embodiment of the present invention.

According to the present invention, large-capacity and large-scale solar tracker 100 using the locking type crisscross connector and the direct cylinder can be obtained due to its simple construction. Since the main post, which shoulders a burden with large part of the load of the structure and the external effort force, is formed of a steel structure or a concrete structure, the scale of the main post may be increased. In order to cope with the large scale of the solar tracker 100, as illustrated in FIG. 19, a complex multistage direct cylinder 120 that has a large capacity and a long stroke distance can be obtained by connecting a plurality of direct cylinders 121 in parallel and connecting a holder 122 to the plurality of direct cylinders 121.

Figure 20:
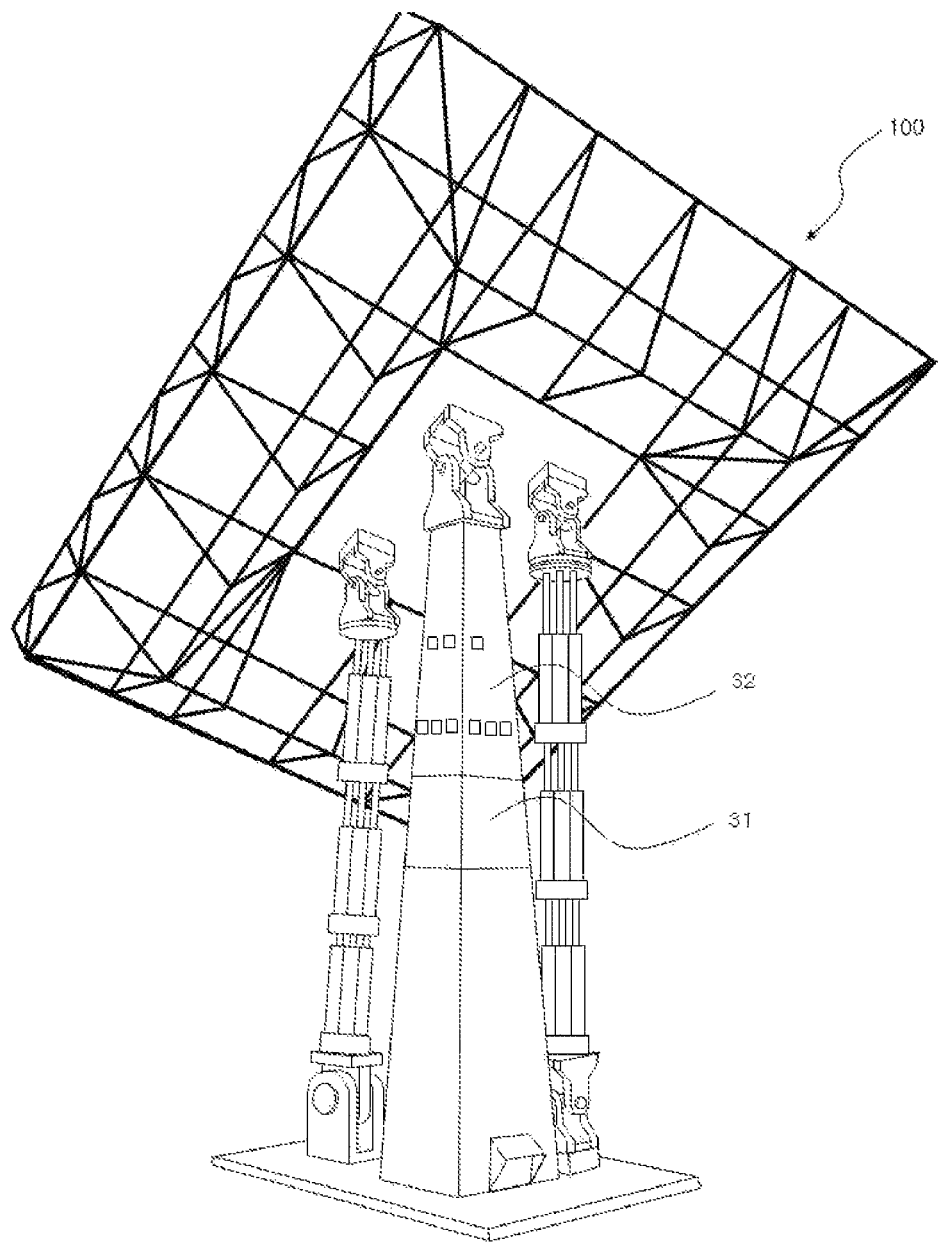
FIG. 20 is a side view of a solar tracker for photovoltaic power generation according to another embodiment of the present invention.

FIG. 20 illustrates a large-scale solar tracker according to another embodiment of the present invention. The large-scale and large-capacity solar tracker 100 may be configured by the complex multistage direct cylinder 120, and in the inside of the main post 30 that is formed of the steel structure or the concrete structure, rainwater storage facilities 31 storing rainwater for the purpose of cooling of the photovoltaic power generation module, resident space for board and lodging and for business, elevating facilitates for moving persons and goods, and a management office for controlling and managing power generation equipment may be provided.

Although preferred embodiments of the present invention have been described for illustrative purposes, those skilled in the art will appreciate that various modifications, additions and substitutions are possible, without departing from the scope and spirit of the invention as disclosed in the accompanying claims. Accordingly, it can be understood that the present invention is not limited to the embodiments as disclosed herein, but is only defined within the scope of the appended claims.

What is claimed is:

1. A solar tracker for photovoltaic power generation that is driven to trace solar light depending on a change of solar altitude and azimuth, comprising:
    a solar cell plate including one or more solar cell panels,
        wherein the solar cell plate includes a frame that supports the solar cell Panel from an outside of the solar cell panel,
        a rotary shaft is installed inside the solar cell panel,
        a worm gear is installed at one end of the rotary shaft, and a motor and a worm are mounted on an upper surface of the frame, and a panel opening and closing adjustment portion is configured to open and close the solar cell panel by rotating the rotary shaft through rotation of the motor and the worm connected to the motor, wherein the worm gear is directly engaged with the worm and is rotated through the worm when the rotary shaft rotates;

an upper structure supporting the solar cell plate;

a main post supporting the upper structure;

a base bottom portion connected to the main post and configured to support the upper structure;

an altitude angle adjustment direct cylinder configured for adjusting an altitude angle of the solar cell plate to correspond to an altitude of the sun that is seasonally changed; and an azimuth angle adjustment direct cylinder configured for adjusting an azimuth angle according to time to correspond to a diurnal movement of the sun, wherein an upper surface of the base bottom portion is fixed to one end portion of the main post, is connected to one end portion of the altitude angle adjustment direct cylinder through a hinge having a single degree of freedom, and is connected to one end portion of the azimuth angle adjustment direct cylinder through a locking type crisscross connector having two degrees of freedom, wherein the locking type crisscross connector includes a crisscross mechanical shaft that can be rotated with the two degrees of freedom, the locking type crisscross connector includes a clamp rod, a clamp bolt, and an actuating cylinder so as to restrict the rotation of the locking type crisscross connector with the two degrees of freedom, the mechanical shaft is configured to be restricted by rotating the clamp bolt through an operation of the clamp rod by the actuating cylinder to lock or unlock the locking type crisscross connector, the clamp rod is connected at one end to the clamp bolt and is connected at another end to an end of the actuating cylinder so that the clamp bolt is configured to be rotated by the clamp rod due to a change in length of the actuating cylinder to restrict or release the rotation of the locking type crisscross connector, and wherein a bottom surface of the upper structure is connected to the other end portions of the main post, the altitude angle adjustment direct cylinder, and the azimuth angle adjustment direct cylinder through locking type crisscross connectors, respectively, and the locking type crisscross connector connected to the upper structure and the azimuth angle adjustment direct cylinder is configured to freely rotate about a length-direction shaft of the azimuth angle adjustment direct cylinder.

2. The solar tracker according to claim 1, wherein, when the upper structure is horizontal to the base bottom portion, one shaft center of a mechanical shaft of the locking type crisscross connector that connects the main post with the bottom surface of the upper structure and one shaft center of a mechanical shaft of the locking type crisscross connector that connects the altitude angle adjustment direct cylinder with the bottom surface of the upper structure coincide with each other about the two mechanical shafts so as to form an azimuth angle rotary shaft, and the other shaft center of the mechanical shaft of the locking type crisscross connector that connects the main post with the bottom surface of the upper structure and one shaft center of a mechanical shaft of the locking type crisscross connector that connects the azimuth angle adjustment direct cylinder with the bottom surface of the upper structure coincide with each other about the two mechanical shafts so as to form an altitude angle rotary shaft that is at right angles to the azimuth angle rotary shaft.

3. The solar tracker according to claim 1, wherein the azimuth angle adjustment direct cylinder and the altitude angle adjustment direct cylinder are configured to form a multistage by connecting the one or more direct cylinders in parallel and connecting a holder with the direct cylinders connected in parallel.

4. The solar tracker according to claim 1, wherein the hinge connecting the base bottom portion to the altitude angle adjustment direct cylinder provides a movement consisting of one degree of rotational freedom between the altitude angle adjustment direct cylinder and the base bottom portion.

5. The solar tracker according to claim 1, wherein the panel opening and closing adjustment portion includes limit switches to control an opening angle of the solar cell panel.

6. The solar tracker according to claim 1, wherein the panel opening and closing adjustment portion includes a worm gear driving shaft that connects the worm gear installed in the one or more solar cell panels in series and a motor connected to one end of the worm gear driving shaft, and the motor rotates to simultaneously open or close the solar cell panels connected in series.

7. The solar tracker according to claim 1, wherein rainwater storage facilities storing rainwater for the purpose of cooling of a photovoltaic power generation module, resident space and facilities for board and lodging and for business, elevating facilitates for moving persons and goods, and electrical control facilities for controlling and managing power generation equipment are provided inside the main post.

8. The solar tracker according to claim 1, wherein the actuating cylinder is an electric, air pressure, or hydraulic cylinder.

9. A solar tracker for photovoltaic power generation that is driven to trace solar light depending on a change of solar altitude and azimuth, comprising:

a solar cell plate including one or more solar cell panels;

an upper structure supporting the solar cell plate;

a main post supporting the upper structure;

a base bottom portion connected to the main post and configured to support the upper structure;

an altitude angle adjustment direct cylinder configured for adjusting an altitude angle of the solar cell plate to correspond to an altitude of the sun that is seasonally changed; and an azimuth angle adjustment direct cylinder configured for adjusting an azimuth angle according to time to correspond to a diurnal movement of the sun, wherein an upper surface of the base bottom portion is fixed to one end portion of the main post, is connected to one end portion of the altitude angle adjustment direct cylinder through a hinge having a single degree of freedom, and is connected to one end portion of the azimuth angle adjustment direct cylinder through a locking type crisscross connector having two degrees of freedom, wherein the hinge provides a movement consisting of one degree of rotational freedom between the altitude angle adjustment direct cylinder and the base bottom portion, wherein the locking type crisscross connector includes a crisscross mechanical shaft that can be rotated with the two degrees of freedom, the locking type crisscross connector includes a clamp rod, a clamp bolt, and an actuating cylinder so as to restrict the rotation of the locking type crisscross connector with the two degrees of freedom, the actuating cylinder is an electric, air pressure, or hydraulic cylinder, and the mechanical shaft configured to be restricted by rotating the clamp bolt through an operation of the clamp rod by the actuating cylinder to lock or unlock the locking type crisscross connector, and wherein a bottom surface of the upper structure is connected to the other end portions of the main post, the altitude angle adjustment direct cylinder, and the azimuth angle adjustment direct cylinder through locking type crisscross connectors, respectively, and the locking type crisscross connector connected to the upper structure and the azimuth angle adjustment direct cylinder is configured to freely rotate about a length-direction shaft of the azimuth angle adjustment direct cylinder.

10. The solar tracker according to claim 9, wherein the clamp rod is connected at one end to the clamp bolt and is connected at another end to an end of the actuating cylinder so that the clamp bolt is rotated by the clamp rod due to a change in length of the actuating cylinder to restrict or release the rotation of the locking type crisscross connector.

11. The solar tracker according to claim 9, wherein the solar cell plate includes a frame that supports the solar cell panel from an outside of the solar cell panel, a rotary shaft is installed inside the solar cell panel, a worm gear is installed at one end of the rotary shaft, and a motor and a worm are mounted on an upper surface of the frame, and a panel opening and closing adjustment portion is configured to open and close the solar cell panel by rotating the rotary shaft through rotation of the motor and the worm connected to the motor, wherein the worm gear is directly engaged with the worm and is rotated through the worm when the rotary shaft rotates.

12. The solar tracker according to claim 9, wherein, when the upper structure is horizontal to the base bottom portion, one shaft center of a mechanical shaft of the locking type crisscross connector that connects the main post with the bottom surface of the upper structure and one shaft center of a mechanical shaft of the locking type crisscross connector that connects the altitude angle adjustment direct cylinder with the bottom surface of the upper structure coincide with each other about the two mechanical shafts so as to form an azimuth angle rotary shaft, and the other shaft center of the mechanical shaft of the locking type crisscross connector that connects the main post with the bottom surface of the upper structure and one shaft center of a mechanical shaft of the locking type crisscross connector that connects the azimuth angle adjustment direct cylinder with the bottom surface of the upper structure coincide with each other about the two mechanical shafts so as to form an altitude angle rotary shaft that is at right angles to the azimuth angle rotary shaft.

13. The solar tracker according to claim 9, wherein the azimuth angle adjustment direct cylinder and the altitude angle adjustment direct cylinder are configured to form a multistage by connecting the one or more direct cylinders in parallel and connecting a holder with the direct cylinders connected in parallel.

14. The solar tracker according to claim 9, wherein the panel opening and closing adjustment portion includes limit switches to control an opening angle of the solar cell panel.

15. The solar tracker according to claim 9, wherein the panel opening and closing adjustment portion includes a worm gear driving shaft that connects the worm gear installed in the one or more solar cell panels in series and a motor connected to one end of the worm gear driving shaft, and the motor is configured to rotate to simultaneously open or close the solar cell panels connected in series.

16. The solar tracker according to claim 9, wherein rainwater storage facilities storing rainwater for the purpose of cooling of a photovoltaic power generation module, resident space and facilities for board and lodging and for business, elevating facilitates for moving persons and goods, and electrical control facilities for controlling and managing power generation equipment are provided inside the main post.

* * * * *